US008416817B2

(12) United States Patent
Chong et al.

(10) Patent No.: US 8,416,817 B2
(45) Date of Patent: Apr. 9, 2013

(54) ALL-NORMAL-DISPERSION FEMTOSECOND FIBER LASER

(75) Inventors: Chin Yu Chong, Ithaca, NY (US); Joel Buckley, Saint Charles, MO (US); Frank Wise, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 12/441,807

(22) PCT Filed: Sep. 18, 2007

(86) PCT No.: PCT/US2007/020134
§ 371 (c)(1),
(2), (4) Date: May 13, 2010

(87) PCT Pub. No.: WO2008/105833
PCT Pub. Date: Sep. 4, 2008

(65) Prior Publication Data
US 2010/0220751 A1    Sep. 2, 2010

Related U.S. Application Data

(60) Provisional application No. 60/845,252, filed on Sep. 18, 2006.

(51) Int. Cl.
*H01S 3/30* (2006.01)
(52) U.S. Cl. .................. 372/6; 372/18; 372/25
(58) Field of Classification Search ............... 372/6, 18, 372/25
See application file for complete search history.

(56) References Cited

U.S. PATENT DOCUMENTS

| | | | | |
|---|---|---|---|---|
| 7,072,101 | B2 * | 7/2006 | Kapteyn et al. | 359/337.5 |
| 7,236,504 | B2 * | 6/2007 | Wang | 372/3 |
| 7,251,258 | B2 * | 7/2007 | Wise et al. | 372/6 |
| 7,573,918 | B1 * | 8/2009 | Soh et al. | 372/9 |
| 7,649,915 | B2 * | 1/2010 | Fermann et al. | 372/18 |
| 7,907,645 | B1 * | 3/2011 | Liu | 372/18 |
| 8,107,161 | B2 * | 1/2012 | Wise et al. | 359/341.1 |
| 2004/0114641 | A1 * | 6/2004 | Wise et al. | 372/6 |
| 2005/0169324 | A1 * | 8/2005 | Ilday et al. | 372/18 |
| 2006/0291521 | A1 * | 12/2006 | Ilday et al. | 372/94 |
| 2011/0280263 | A1 * | 11/2011 | Kieu et al. | 372/6 |
| 2012/0033686 | A1 * | 2/2012 | Abdelalim et al. | 372/6 |
| 2012/0224597 | A1 * | 9/2012 | Jespersen et al. | 372/29.02 |

FOREIGN PATENT DOCUMENTS

| WO | WO2008105833 | A2 * | 9/2008 |
|---|---|---|---|
| WO | WO2008127451 | A2 * | 10/2008 |
| WO | WO2010039310 | A1 * | 4/2010 |
| WO | WO2010056920 | A1 * | 5/2010 |

OTHER PUBLICATIONS

Chin Yu Chong,"Femtosecond Fiber Lasers and Amplifiers Based on the Pulse Propagation At Normal Dispersion" Aug. 2008, pp. 1-199.*
Invetors search on google, Dec. 2, 2012 , pp. 1-2.*
Inventors name search on google, Dec. 2, 2012, pp. 1-2.*

(Continued)

*Primary Examiner* — Tod T Van Roy
*Assistant Examiner* — Delma R Forde
(74) *Attorney, Agent, or Firm* — Perkins Coie LLP

(57) ABSTRACT

A modelocked fiber laser is designed to have strong pulse-shaping based on spectral filtering of a highly-chirped pulse in the laser cavity. The laser generates femtosecond pulses without a dispersive delay line or anomalous dispersion in the cavity.

23 Claims, 1 Drawing Sheet

OTHER PUBLICATIONS

Herda, R., et al., "Dispersion compensation-free fiber laser mode-locked and stabilized by a high-contrast saturable absorber mirror," Solid State Lasers and Amplifiers, Proceedings of SPIE, vol. 5460, pp. 14-22, 2004.

Tamura, K., et al., 77-fs Pulse Generation from a Stretched-Pulse Mode-Locked All-Fiber Ring Laser, Optics Letters, 18(13):1080-1082, 1993.

Kieu, K., et al., "Sub-100 fs Pulses at Watt-Level Powers from a Dissipative-Soliton Fiber Laser," Optics Letters, 34 (5):593-595, 2009.

Fermann, M. E., et al., Self-Similar Propagation and Amplification of Parabolic Pulses in Optical Fibers, Physical Review Letters, 84(26):6010-6013, 2000.

Kruglov, V. I., et al., "Self-Similar Propagation of High-Power Parabolic Pulses in Optical Fiber Amplifiers," Optics Letters, 25(24):1753-1755, 2000.

Kruglov, V. I., et al., "Self-Similar Propagation of Parabolic Pulses in Normal-Dispersion Fiber Amplifiers," Opt. Soc. Am. B., 19(3):461-469, 2002.

Dudley, J. M., et al., "Self-Similarity in Ultrafast Nonlinear Optics," Nature Physics, 3:597-603, 2007.

Ilday, F. O., et al., "Self-Similar Evolution of Parabolic Pulses in a Laser," Physical Review Letters, 92 (21):213902-1-213902-4, 2004.

Dudley, J., et al., "Generation and Interaction of Parabolic Pulses in High Gain Fiber Amplifiers and Oscillators," Optical Fiber Communication Conference, 2001 OSA Technical Digest Series (Optical Society of America), paper WP4, 2001.

Oktem, B., et al., "Soliton-Similariton Fibre Laser," Nature Photonics, 4:307-311, 2010.

Renninger, W. H., et al., Giant-Chirp Oscillators for Short-Pulse Fiber Amplifiers, Optics Letters, 33(24):3025-3027, 2008.

Schreiber, T., et al., "On the Study of Pulse Evolution in Ultra-Short Pulse Mode-Locked Fiber Lasers by Numerical Simulations," Optics Express, 15(13):8252-8262, 2007.

\* cited by examiner

ALL-NORMAL-DISPERSION FEMTOSECOND FIBER LASER

CROSS REFERENCE TO RELATED APPLICATIONS

This application claims the benefit, under 35 U.S.C. 119 (e), of U.S. Provisional Application No. 60/845,252, filed Sep. 18, 2006, which is hereby incorporated by reference in its entirety.

GOVERNMENT SPONSORSHIP STATEMENT

The work on this invention was supported by the National Science Foundation under Grant No. ECS-0500956 and by the National Institutes of Health under Grant No. EB002019. The Government has certain rights in the invention.

BACKGROUND OF THE INVENTION

1. Field of the Invention

The present invention relates in general to a femtosecond fiber laser that employs only normal dispersion elements through use of a unique pulse shaping technique. A spectral filter and other non-anomalous dispersion elements are employed in the technique.

2. Description of the Background Art

The need to compensate group-velocity dispersion (GVD) is ubiquitous in femtosecond pulse generation and propagation. Prisms, diffraction gratings and chirped mirrors have all been used to compensate or control GVD. Reliable femtosecond lasers had to await the development of a low-loss means of introducing controllable GVD. Pulse formation in modern femtosecond lasers is dominated by the interplay between nonlinearity and dispersion. In all cases of practical interest, a positive (self-focusing) nonlinearity is balanced by anomalous GVD. The need to compensate normal GVD in the laser, along with the balance of nonlinearity in soliton-like pulse shaping, underlies the presence of anomalous GVD in femtosecond lasers.

Most femtosecond lasers have segments of normal and anomalous GVD, so the cavity consists of a dispersion map, and the net or path-averaged cavity dispersion can be normal or anomalous. With large anomalous GVD, soliton-like pulse shaping produces short pulses with little chirp. Some amplitude modulation is required to stabilize the pulse against the periodic perturbations of the laser resonator. Pulse formation and pulse evolution become more complex as the cavity GVD approaches zero, and then becomes normal. The master-equation treatment of solid-state lasers, based on the assumption of small changes of the pulse as it traverses cavity elements, shows that stable pulses can be formed with net normal GVD. Nonlinear phase accumulation, coupled with normal GVD, chirps the pulse. The resulting spectral broadening is balanced by gain-narrowing. By cutting off the wings of the spectrum, gain dispersion shapes the temporal profile of the chirped pulse. Proctor et al showed that the resulting pulses are long and highly-chirped, as predicted by the analytic theory (B. Proctor, E. Westwig, and F. Wise, "Operation of a Kerr-lens mode-locked Ti:sapphire laser with positive group-velocity dispersion," Opt. Lett. 18, 1654-1656 (1993)). Stable pulse trains can even be produced without dispersion compensation, but the output pulses are picoseconds in duration and deviate substantially from the Fourier-transform limited duration, even after dechirping with anomalous GVD external to the cavity.

Fiber lasers can be constructed entirely of fiber with anomalous GVD, to generate solitons as short as ~200 fs in duration. However, the pulse energy is restricted by the soliton area theorem and spectral sidebands to ~0.1 nJ. Much higher energies are obtained when the laser has segments of normal and anomalous GVD. In general, the pulse breathes (i.e., the pulse duration varies periodically) as it traverses the cavity. Dispersion-managed solitons are observed as the net GVD varies from small and anomalous to small and normal, and selfsimilar and wave-breaking-free pulses are observed with larger normal GVD. The large changes in the pulse as it traverses the laser preclude an accurate analytical treatment, so numerical simulations are employed to study these modes. Among fiber lasers, Yb-based lasers have produced the highest femtosecond-pulse energies, recently reaching 15-20 nJ as reported in Buckley et al. (J. R. Buckley, F. W. Wise, F. Ö. Ilday, and T. Sosnowski, "Femtosecond fiber lasers with pulse energies above 10 nJ," Opt. Lett. 30, 1888-1890 (2005)). The normal GVD of single-mode fiber (SMF) around 1 μm wavelength has been compensated by diffraction gratings, which detract from the benefits of the waveguide medium.

With the goal of building integrated fiber lasers, microstructure fibers and fiber Bragg gratings have been implemented to compensate dispersion at 1 μm. However, performance is sacrificed compared to lasers that employ diffraction gratings. Although from a practical point of view it would be highly desirable to design femtosecond-pulse fiber lasers without elements that provide anomalous GVD in the cavity, until now, no known fiber laser can generate ~100-fs pulses without using anomalous GVD elements.

SUMMARY OF THE INVENTION

It is normally assumed that anomalous GVD is required in short-pulse lasers, for one of two reasons: 1) to compensate for components with normal GVD or 2) to form a pulse by the soliton mechanism of nonlinearity balancing anomalous GVD. The inventors have discovered that the aforementioned anomalous dispersion elements can in fact be eliminated from a fiber laser capable of generating femtosecond duration pulses (i.e. pulses with durations of hundreds of femtoseconds or less), thereby resulting in a femtosecond fiber laser that is formed with a cavity whose dispersion elements consist only of elements with normal GVD. The basis of the invention is a new pulse-shaping process: by increasing the nonlinear phase shift accumulated by a pulse circulating in the cavity and using a spectral filter to pass a narrow slice of the spectrum, self-amplitude modulation via spectral filtering is enhanced. This self-amplitude modulation dominates other pulse-shaping process, and the result is a highly-chirped pulse that circulates inside the laser cavity.

In the preferred embodiment of the invention, the laser cavity includes two key pulse shaping elements. A pulse chirping element broadens a multiple frequency pulse and spreads its frequency components apart over time. A spectral filter is then employed to pass a narrow slice of the chirped pulse containing only frequency components centered about a selected center frequency. Preferably, the cavity also includes other conventional elements for additional self-amplitude modulation of the pulse that are mainly provided to insure start up and stable operation of the laser. In the preferred embodiment, these include nonlinear polarization evolution (NPE) inducing elements, such as a polarization beam splitter, wave plates, etc. Being a fiber laser, the laser of course also includes a fiber gain element, which may be made from doped Yb or a similar material.

In experiments conducted on a laser constructed in accordance with the preferred embodiment, the resulting pulse before it exits the cavity is still chirped but is stable and of a picosecond magnitude. The pulse is then output from the cavity and preferably passed through a final dechirping element, such as a dispersive delay line, to form the femtosecond pulses. In the experiments, the picoseconds pulses in the cavity were dechirped to 170 fs outside the laser cavity. These results are remarkable considering that the cavity consisted of ~10 characteristic dispersion lengths of fiber with respect to the dechirped pulse, yet no dispersion control was provided. The pulse energy was 1-3 nJ, and the laser is stable and self-starting. The laser thus employs a new approach to modelocking which offers significant practical advantages over previous fiber lasers through the freedom from anomalous dispersion.

BRIEF DESCRIPTION OF THE DRAWINGS

The features and advantages of the present invention will become apparent from the following detailed description of a preferred embodiment thereof, taken in conjunction with the accompanying drawings which are briefly described a follows.

DETAILED DESCRIPTION OF THE INVENTION

Figures 1, 2:
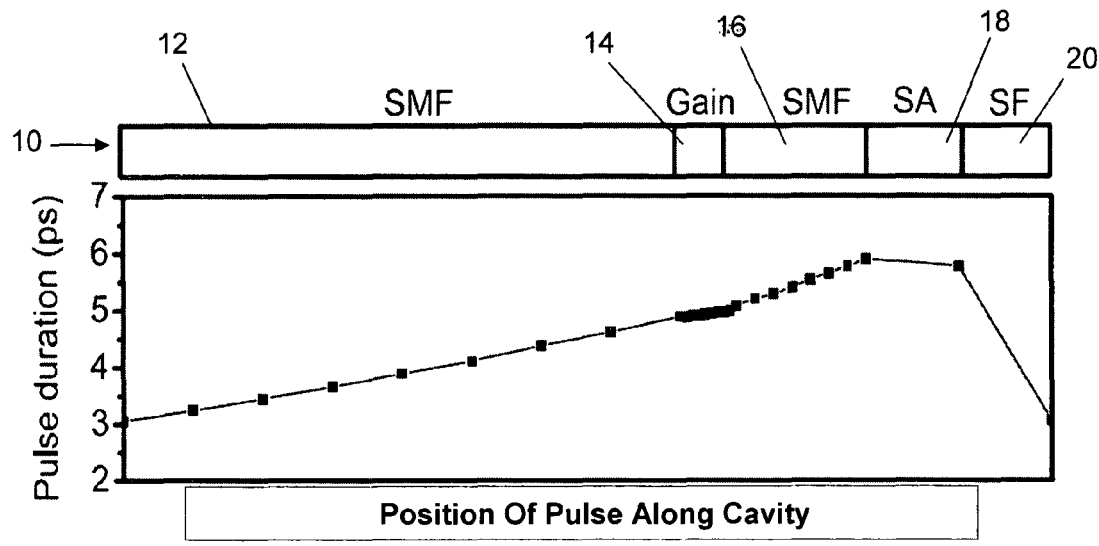
FIG. 1 is a schematic diagram of a laser cavity depicting the elements employed to simulate a fiber laser using dispersion elements with only normal dispersion in accordance with the operating theory of the present invention. A graph is also provided that shows the duration of a pulse as it travels through the various elements in the cavity based on simulations.
FIG. 2 is a schematic diagram of an all-normal-dispersion fiber laser that is configured in accordance with a preferred embodiment of the present invention and was actually constructed to verify the operational theory of the invention.

The design of a femtosecond fiber laser without dispersion control in the cavity in accordance with the operational theory of the present invention will now be presented in greater detail. The master-equation analysis does not apply quantitatively to fiber lasers, but one is guided qualitatively and intuitively by its predictions. FIG. 1 shows the elements of a fiber laser cavity 10 that were employed in a simulation to test the theory of the present invention. These elements include a first, fairly long segment of single-mode fiber (SMF) 12, a short segment of doped gain fiber 14, a second segment of SMF 16 after the gain fiber 12, a saturable absorber (SA) 18; and a spectral filter (SF) 20. A ring cavity is assumed (though the invention is not limited to use with a ring cavity), so the pulse enters the first segment of SMF 12 after the SF 20. As illustrated by the graph of FIG. 1, a pulse traveling through the cavity 10 experiences broadening in the sections of SMF 12 and 16, followed by a corresponding narrowing in the SA 18 and especially in the SF 20.

Numerical simulations show that stable solutions do exist in such a laser for a reasonable range of parameters. The gain bandwidth has a major influence on the pulse evolution. With large gain bandwidth (>~30 nm), approximately parabolic pulses evolve as in a self-similar laser. As the bandwidth is reduced to ~10 nm, the spectrum develops sharp peaks on its edges, and for narrower bandwidths the solutions do not converge. The simulations show that spectral filtering of a strongly phase-modulated pulse can produce substantial amplitude modulation under realistic conditions. With additional amplitude modulation from NPE, stable solutions exist. The pulse is highly-chirped inside the cavity, but the phase is roughly parabolic near the peak of the pulse, so the pulse can be dechirped outside the laser.

With reference to FIG. 2, a preferred embodiment of a fiber laser 30 is illustrated that was actually constructed to verify the operational theory of the present invention. The phrase "fiber laser" means that optical fiber is used at least for the gain medium of the fiber but typically for many of the lasers other components as well. The laser 30 includes a closed ring cavity 32 that includes dispersion elements having only normal GVD. More particularly, a fiber section 34 is provided which preferably consists of ~3 m of SMF 36 and 20 cm of highly-doped Yb gain fiber 38, followed by another ~1 m of SMF 40. It should be understood, however, that other types of fibers, such as multimode fibers, could be employed in place of SMF if desired. In addition, the two segments of SMF 36 and 40 could be replaced by a single section if desired. Further, there are many other active materials that could be used to make the gain fiber 38. The core diameter of the gain fiber 38 was chosen to be 4-μm core diameter (which is smaller than the 6-μm core diameter selected for the SMF segments 36 and 40) to increase self-phase modulation (SPM) in the gain fiber 38. A 980-nm laser diode 42 delivers ~350 mW into the core of the gain fiber 38 via a wavelength-division multiplexer (WDM) 44 as is conventional in a ring fiber laser.

The fiber section 34 is interfaced at each end by first and second collimators 46 and 48 to various non-fiber elements. NPE, which serves the same function as the saturable absorber 18 in FIG. 1, is implemented with quarter-waveplates (QWP) 50 and 52, a half-waveplate (HWP) 54, and a polarizing beamsplitter (PBS) 56. An output 58 of the laser cavity 32 is taken directly from an NPE ejection port 60 of the PBS 56.

For the spectral filter, an interference filter 62 centered at 1030 nm, with 10 nm bandwidth, is employed. An isolator 64 is also provided in the cavity 32 to insure one directional flow of the laser pulses as is conventional.

The optimum location for the filter 62 initially was not clear. Placing it after the gain fiber 38 or second SMF segment 40 would maximize the amplitude modulation from spectral filtering. However, the desire also is to output the broadest spectrum and the largest pulse energy, to achieve the shortest and most intense pulse. Considering these factors, the filter 62 preferably should be placed after the beam splitter 56. This location also allows as much of the laser to be spliced together as possible. The total dispersion is ~0.1 $ps^2$ for this arrangement. It should be understood, however, that the laser 30 can operate with the elements in the cavity 32 being rearranged in numerous different configurations.

In experiments on the laser 30 of FIG. 2, the threshold pump power for modelocking was ~300 mW. Self-starting modelocked operation was achieved by adjustment of the waveplates. The laser 30 produced a stable pulse train with 45 MHz repetition rate. Although the continuous-wave output power can be as high as ~200 mW, in modelocked operation the power was limited to 120 mW, which corresponds to a pulse energy of ~3 nJ. Stable single-pulsing was verified with a fast detector down to 500 ps, and by monitoring the interferometric autocorrelation out to delays of ~100 ps. Also, the spectrum was carefully monitored for any modulation that would be consistent with multiple pulses in the cavity. Remarkably, there was no evidence of multi-pulsing at any available pump power. However, with a single pump diode the pump power only exceeded the modelocking threshold by ~20%.

Typical results for the output of the laser 30 established that the laser's spectrum is consistent with significant SPM within the cavity. The laser generated ~1.4-ps chirped pulses at the output 58 of the cavity, but these pulses were dechirped with an optional pair of diffraction gratings, dispersive delay line or other suitable dechirping elements 66 disposed outside the laser cavity 32. The pulse output 68 from the dechirping element 66 was narrowed to 170 fs. The dechirped pulse duration was within ~16% of the Fourier-transform limit. The interferometric autocorrelation shows noticeable side-lobes, which arise from the steep sides and structure of the spectrum. Nevertheless, these amount to only ~10% of the pulse energy. The output pulse energy was ~2.7 nJ, and after dechirping with the lossy gratings 54, the pulse energy was ~1 nJ. Pulse energies of 2 nJ could be obtained by dechirping with high-efficiency gratings or photonic-bandgap fiber. The experiments established that the laser is stable and self-starting. In addition to verifying as carefully as possible that the laser is not multi-pulsing, the pulse peak power was compared to that of a fully-characterized femtosecond laser available in the lab. Within the experimental uncertainties, the two-photon photocurrent induced by the all-normal-dispersion laser scales correctly with the nominal peak power, which is ~5 kW.

Detailed understanding of pulse formation and evolution in the subject laser will require more experimental work and theoretical analysis. Because the simulated laser is not identical to the experimental version, it is not appropriate to compare the calculated and measured performance in detail. However, qualitative and even semi-quantitative observations of the laser properties are consistent with the intended pulse-shaping through spectral filtering. The behavior of the laser 30 depends critically on the spectral filter 62: without it, stable pulse trains are not generated. By rotating the spectral filter 62 to vary the center wavelength, either of the sharp spectral features can be suppressed, which may slightly improve the pulse quality. When the spectrum changes, the magnitude of the chirp on the output pulse can change substantially: the pulse duration varies from approximately 1 to 2 ps.

With standard femtosecond Yb-doped fiber lasers, mechanical perturbation of the fiber extinguishes modelocking. In the laser of the subject invention, it is possible to touch and move the fiber without disrupting modelocking, which indicates that NPE plays a reduced role in pulse-shaping. Simulations show that the role of NPE is reduced compared to a laser with a dispersion map, but it is still crucial to the generation of stable pulses.

Although the invention has been disclosed in terms of a preferred embodiment and variations thereon, it will be understood that numerous additional variations and modifications could be made thereto without departing from the scope of the invention as defined by the following claims.

The invention claimed is:

1. A fiber laser for facilitating generation of femtosecond duration pulses comprises a gain fiber to increase the energy of a pulse in a laser cavity that is free of anomalous dispersion and whose dispersion elements inside said cavity consist only of elements with normal group velocity dispersion, said cavity including one or more dispersion elements, each of which provides only normal group velocity dispersion, said laser cavity at least including:
   a chirping element for broadening a multiple frequency component pulse in said cavity and spreading said frequency components in said pulse apart over time; and
   a spectral bandpass filter for passing a portion of said chirped pulse including only frequency components in a narrow range around a selected center frequency, thereby producing self-amplitude modulation of said pulse.

2. The fiber laser of claim 1, wherein said cavity further includes one or more elements for producing additional self-amplitude modulation of said pulse for stabilizing the laser and assisting the laser during startup.

3. The fiber laser of claim 2, wherein said one or more elements for producing additional self-amplitude modulation of said pulse include one or more elements selected from the group comprising nonlinear polarization evolution (NPE) elements and a saturable absorber.

4. The laser of claim 1, wherein said spectral bandpass filter is selected from the group comprising an interference filter and a birefringent filter combined with a wave plate.

5. A fiber laser for generating femtosecond duration pulses comprises a gain fiber to increase the energy of a pulse in a laser cavity that can only exhibit normal group velocity dispersion, said cavity including one or more dispersion elements, each of which provides only normal group velocity dispersion, said laser cavity at least including:
   a chirping element for broadening a multiple frequency component pulse in said cavity and spreading said frequency components in said pulse apart over time; and
   a spectral bandpass filter for passing a portion of said chirped pulse including only frequency components in a narrow range around a selected center frequency, thereby producing self-amplitude modulation of said pulse,
   wherein said laser cavity includes an output and said laser further comprises a pulse dechirping element connected to said output for narrowing said pulse to femtosecond duration.

6. The laser of claim 5, wherein said dechirping element comprises a pair of diffraction gratings which receive the output from said laser cavity.

7. The laser of claim 1, wherein said chirping element is selected from the group comprising a pair of diffraction gratings and a dispersive delay line.

8. The laser of claim 7, wherein said waveguide is a single mode fiber (SMF).

9. A method for shaping a pulse in a laser cavity of a fiber laser that employs a gain fiber to increase the energy of a pulse in said laser cavity and is free of anomalous dispersion inside said cavity by having only dispersion elements with normal group velocity dispersion inside said cavity to facilitate generation of femtosecond duration pulses by said laser, said cavity also including one or more dispersion elements, each of which provides only normal group velocity dispersion, said method comprising the steps of:
   chirping a multiple frequency component pulse in said cavity by broadening said pulse and spreading said frequency components in said pulse apart over time; and
   filtering said chirped pulse with a band pass spectral filter that passes only a portion of said chirped pulse having only frequency components in a narrow range around a selected center frequency; thereby producing self-amplitude modulation of said pulse.

10. The method of claim 9, wherein said step of chirping the pulse comprises passing the pulse through an optical waveguide.

11. The method of claim 10, wherein said step of chirping the pulse comprises passing the pulse through a segment of single mode fiber (SMF).

12. The method of claim 9, wherein the step of filtering said chirped pulse comprises passing said chirped pulse through a band pass spectral filter selected from the group comprising an interference filter and a birefringent filter combined with a wave plate.

13. The method of claim 9, further comprising the step of producing additional self-amplitude modulation of said pulse.

14. The method of claim 13, wherein said step of producing additional self- modulation of said pulse comprises passing said pulse through one or more elements selected from the group comprising nonlinear polarization evolution (NPE) elements and a saturable absorber.

15. A method for shaping a pulse in a laser cavity of a fiber laser that employs a gain fiber to increase the energy of a pulse in said laser cavity that can only exhibit normal group velocity dispersion inside said laser cavity to facilitate generation of femtosecond duration pulses by said laser, said cavity also including one or more dispersion elements, each of which provides only normal group velocity dispersion, said method comprising the steps of:

chirping a multiple frequency component pulse in said cavity by broadening said pulse and spreading said frequency components in said pulse apart over time; and filtering said chirped pulse with a band pass spectral filter that passes only a portion of said chirped pulse having only frequency components in a narrow range around a selected center frequency; thereby producing self-amplitude modulation of said pulse wherein after said pulse is shaped in said cavity, the shaped pulse is output from said cavity and passed through a dechirping element to narrow the duration of the pulse.

16. The method of claim 15, wherein said dechirping element is selected from the group comprising a pair of diffraction gratings and a dispersive delay line.

17. The method of claim 13, wherein said step of producing additional self-modulation of said pulse comprises passing said pulse through nonlinear polarization evolution (NPE) elements.

18. The fiber laser of claim 2, wherein said one or more elements for producing additional self-amplitude modulation of said pulse include nonlinear polarization evolution (NPE) elements.

19. A fiber laser for facilitating generation of femtosecond duration pulses via mode locking, comprising:

a laser cavity that includes only elements with normal group velocity dispersion inside the laser cavity and is free of anomalous dispersion inside the laser cavity, the laser cavity including a gain fiber that exhibits a normal group velocity dispersion and increases energy of a pulse in the laser cavity, and dispersion elements, each of which provides only normal group velocity dispersion, wherein the laser cavity is structured to effectuate broadening of a multiple frequency component pulse in the laser cavity and spreading frequency components in the multiple frequency component pulse apart over time to produced a chirped pulse, wherein the laser cavity includes a spectral bandpass filter that passes a narrow slice of the chirped pulse containing only frequency components centered about a selected center frequency and exhibits a normal group velocity dispersion, and wherein the laser cavity is structured to achieve self-amplitude modulation of the chirped pulse and to achieve mode locking.

20. The fiber laser of claim 19, wherein the laser cavity is a closed optical ring cavity and includes nonlinear polarization evolution (NPE) elements that stabilize chirped pulses in the laser cavity along a selected optical polarization and each exhibit only normal group velocity dispersion.

21. The fiber laser of claim 20, wherein the nonlinear polarization evolution (NPE) elements include first and seconds quarter-waveplates, a polarizing beamsplitter between the first and second quarter-waveplates, and a half-waveplate, wherein the polarizing beamsplitter selects light of the chirped pulses in the selected optical polarization out of the laser cavity.

22. The fiber laser of claim 19, wherein the laser cavity is structured to render a phase of each chirped pulse to be parabolic near a peak of the chirped pulse, and wherein the fiber laser further includes a dechirping element outside the laser cavity to dechirp the chirped pulses output by the laser cavity.

23. The fiber laser of claim 19, wherein the laser cavity is in a cavity configuration that is not a ring configuration.

* * * * *